United States Patent
Suzuki et al.

(10) Patent No.: US 7,261,816 B2
(45) Date of Patent: Aug. 28, 2007

(54) ION-EXCHANGE FILTER

(75) Inventors: Koji Suzuki, Shizuoka (JP); Shinichiro Takemoto, Kanagawa (JP)

(73) Assignees: Toyo Roki Seizo Kabushiki Kaisha, Shizuoka (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/997,984

(22) Filed: Nov. 29, 2004

(65) Prior Publication Data

US 2005/0115884 A1  Jun. 2, 2005

(30) Foreign Application Priority Data

Nov. 28, 2003 (JP) ............................. 2003-400036

(51) Int. Cl.
    *B01D 27/02* (2006.01)
(52) U.S. Cl. ...................................... 210/282; 210/287
(58) Field of Classification Search ................ 210/251, 210/282, 287, 289
    See application file for complete search history.

(56) References Cited

U.S. PATENT DOCUMENTS

| | | | | |
|---|---|---|---|---|
| 5,277,802 A | * | 1/1994 | Goodwin | 210/202 |
| 5,980,716 A | * | 11/1999 | Horinouchi et al. | 204/524 |
| 6,197,193 B1 | * | 3/2001 | Archer | 210/266 |
| 6,569,910 B1 | * | 5/2003 | Spindler et al. | 521/30 |
| 2005/0109700 A1 | * | 5/2005 | Bortun et al. | 210/660 |

* cited by examiner

*Primary Examiner*—Ivars C. Cintins
(74) *Attorney, Agent, or Firm*—Young & Thompson

(57) ABSTRACT

A fuel cell system includes an ion-exchange filter, which is provided with a cartridge which is filled up with an ion-exchange resin. The cartridge includes one of a pressure-loss emphasizing type cartridge and an ion-exchange efficiency emphasizing type cartridge, which are selectively exchanged with each other, for a common case of the ion-exchange filter. The ion-exchange efficiency emphasizing type cartridge is one for an ion-exchange filter having a high pressure loss and high ion-exchange efficiency and, on the other hand, the pressure-loss emphasizing type cartridge is one for an ion-exchange filter having a pressure loss lower than that of the former ion-exchange filter and an ion-exchange efficiency lower than that of the former ion-exchange filter.

7 Claims, 4 Drawing Sheets

ION-EXCHANGE FILTER

FIELD OF THE INVENTION

The present invention relates to an ion-exchange (ion-exchanging) filter for removing impurity ion confused in a fluid flowing in a circuit of a fuel cell system.

RELATED ART

A fuel cell is a kind of battery for generating electricity through an electrochemical reaction between hydrogen and oxygen in atmosphere and is expected as a high efficient power source for a new generation of vehicle.

In order to cool a fuel cell body, i.e., fuel cell stack, performing the reaction between the hydrogen and oxygen, a circulation circuit for cooling liquid, i.e., water, is provided in a fuel cell system. In such system, if ion leaks into the cooling water from a duct in the circulation circuit, an electrical conductivity increases and a power generation efficiency of the fuel cell body hence decreases. In order to obviate such defect, an ion-exchange filter for removing the ion in the cooling water is provided for the cooling water circulation circuit.

Furthermore, in a case of applying moisture to the fuel cell body, it is also necessary to supply a pure water having a low electrical conductivity. In order to lower the electrical conductivity of the pure water for applying moisture, an ion-exchange filter for removing ion in the pure water will be also utilized.

Incidentally, since a vehicle such as automobile mounted with a fuel cell system run by means of self-generation system, it is desired to effectively utilize the generated power as much as possible for the running of the automobile. In a case, however, that a load of a pump for circulating the cooling water is high, a large percent (%) of generated power will be utilized for operating the pump, and hence, the generated power will not be effectively utilized for the running of the automobile. In order to lower the pump load for reducing the power to be utilized for operating the pump, it is required to lower pressure loss or to reduce water-flow resistance in the cooling water circulation circuit. It is also of course required for the ion-exchange filter incorporated in this circulation circuit to provide a low pressure loss.

In a case, however, if the pressure loss of the ion-exchange filter is extremely suppressed, an ion exchanging performance, which is essential object of the ion-exchange filter, i.e., ion-exchange efficiency will become insufficient. Thus, a matter for improving the ion exchanging efficiency contradicts with a matter for lowering the pressure loss of the ion-exchange filter, and both the matters will not be achieved at the same time, thus being inconvenient and defective.

SUMMARY OF THE INVENTION

The technical matter for exchanging ion is closely related to chemical reaction speed and, thus, it may be called "natural phenomenon", which is not changed only by a physical structure of the ion-exchange filter. That is, it seems difficult to satisfy both of making ion-exchange efficiency and making low the pressure-loss only by using one kind of ion-exchange filter. The inventor of the subject application studied and conceived to selectively use one of two kinds of cartridges which is incorporated in the ion-exchange filter as occasion demands so as to provide the ion-exchange filter having high ion-exchange efficiency or low pressure-loss.

An object of the present invention is therefore to substantially eliminate defects or drawbacks encountered in the prior art mentioned above and to provide an ion-exchange filter, particularly, for a fuel cell system, having a structure capable of effectively changing pressure-loss emphasizing type cartridge of the ion-exchange filter and ion-exchange efficiency emphasizing type cartridge thereof one another.

This and other objects can be achieved according to the present invention by providing an ion-exchange filter, particularly, for a fuel cell system comprising:

a case having an inlet through which a fluid flows thereinto and an outlet through which the fluid flows out therefrom; and a cartridge which is disposed in the case and filled up with an ion-exchange resin, said cartridge including one of a pressure-loss emphasizing type cartridge and an ion-exchange efficiency emphasizing type cartridge, which are exchanged with each other, and in which the ion-exchange efficiency emphasizing type cartridge is one for an ion-exchange filter having a high pressure loss and high ion-exchange efficiency and, on the other hand, the pressure-loss emphasizing type cartridge is one for an ion-exchange filter having a pressure loss lower than that of the former ion-exchange filter and an ion-exchange efficiency lower than that of the former ion-exchange filter.

In one preferred embodiment of the above aspect, the ion-exchange efficiency emphasizing type cartridge includes an ion-exchange resin accommodating portion having a hollow cylindrical structure, having both ends closed by end members, respectively, which is filled up with the ion-exchange resin and in which the fluid flows in an axial direction of the cylindrical structure from one end thereof towards another end thereof.

At least one of one and another end members of the ion-exchange resin accommodating portion may be formed with a hole through which the fluid flows, the hole being covered with a mesh member having a mesh net size smaller than a size of the ion-exchange resin disposed inside the ion-exchange resin accommodating portion. The other one end member of the ion-exchange resin accommodation portion may be disposed to be slidable in the axial direction thereof.

In another preferred embodiment, the pressure-loss emphasizing type cartridge includes an ion-exchange resin accommodating portion having a hollow cylindrical structure, having an inner cylindrical member and an outer cylindrical member, which are arranged coaxially with each other and has both ends closed by end members, respectively, and the ion-exchange resin accommodation portion is filled up with the ion-exchange resin so that the fluid flows in an axial direction of the cylindrical structure from one end thereof towards another end thereof.

At least one of one and another end portions of the ion-exchange resin accommodating portion is formed with a hole through which the fluid flows, the hole being covered with a mesh member having a mesh net size smaller than a size of the ion-exchange resin disposed inside the ion-exchange resin accommodating portion.

An orifice may be formed to at least one of the inlet and outlet formed to the case.

According to the present invention of the structures and characters mentioned above, the ion-exchange filters of the high exchanging efficiency emphasizing type and of the low pressure-loss emphasizing type can be selectively utilized only by exchanging the cartridges one another in accordance with the specific purposes or use objects of the fuel cell system, for example. That is, the ion-exchange filters having different performances can be realized only by changing the cartridge into which the ion-exchange resin is accommodated without changing the design of the outer case, thus being advantageous even in economical view.

Furthermore, the cartridges for the ion-exchange efficiency emphasizing type filter and the pressure-loss emphasizing type filter of the present invention have substantially the same outer shape, so that these cartridges can be easily mounted to the case at the cartridge exchanging operation.

In addition, by changing the diameters of the orifice formed to the case and/or holes formed to the ion-exchange resin accommodating portions of the cartridges, the pressure loss and/or ion-exchange efficiency of the ion-exchange filter can be effectively changed.

The nature and further characteristic features of the present invention will be made more clear from the following descriptions made with reference to the accompanying drawings.

DESCRIPTION OF THE PREFERRED EMBODIMENT

Beforehand an explanation of an ion-exchange (or ion-exchanging) filter according to the present invention with reference to the accompanying drawings, it is to be noted that an ion-exchange filter is generally incorporated in a cooling circuit for cooling a fuel cell body, which may be called herein as fuel cell stack and a humidifying circuit for humidifying an ion exchanging film of the fuel cell stack. Further, as the cooling liquid, generally, there is utilized water or mixture solution of ethylene glycol and water in consideration of anti-freezing function, and as a fluid for humidification, there is utilized pure water. The ion-exchange film is an element for removing ions contained in such water, ethylene-glycol water and pure water to thereby reduce electrical conductivity.

The ion-exchange filter according to the present invention will be described hereunder with reference to the accompanying drawings.

Figure 1:
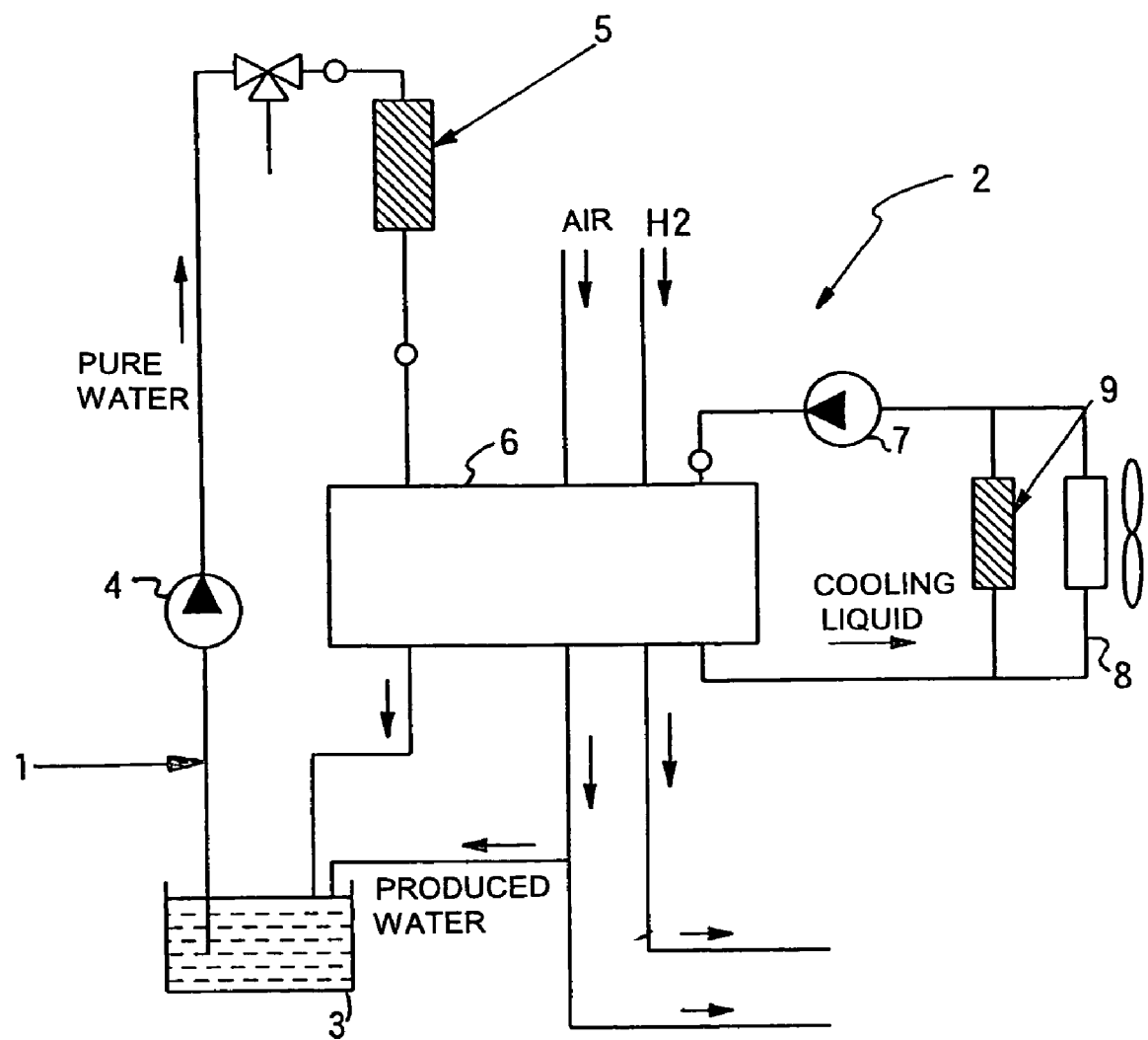
FIG. 1 shows a diagram representing one example of a fuel cell system into which an ion-exchange filter according to an embodiment of the present invention is incorporated.

FIG. 1 shows one example of the fuel cell system provided with an ion-exchange filter according to the present invention. This fuel cell system comprises a pure water humidifying unit 1 for humidifying an ion-exchange film in a fuel cell stack 6 and a cooling unit 2 for cooling the fuel cell stack 6.

In the pure water humidifying unit 1, pure water stored in a pure-water tank 3 is pumped up by a pump 4, and the pumped-up pure water passes through an ion-exchange filter 5 to reduce the electrical conductivity and then supply the pure water into the fuel cell stack 6 to thereby humidify the ion-exchange film disposed inside the fuel cell stack 6. The pure water not utilized for the humidification is returned to the pure-water tank 3. Water generated through a reaction to an air-pole of the fuel cell stack 6 is also recovered to the pure-water tank 3.

In the cooling unit 2, a pump 7 is operated to circulate the cooling liquid such as water between the fuel cell stack 6 and a radiator 8. The cooling liquid of which heat is released by the radiator 8 is supplied to the fuel cell stack 6, and the cooling liquid after cooling the fuel cell stack 6 is supplied to the radiator 8. In order to obtain a cooling liquid having a low electrical conductivity, the cooling unit 2 is provided with an ion-exchange filter (or ion exchanging filter) 9.

Although the ion-exchange filter of the present invention may be provided for either one of the pure-water humidifying unit 1 or cooling unit 2, the ion-exchange filter 9 provided for the cooling unit 2 will be mentioned hereunder as one preferred embodiment.

Figure 2:
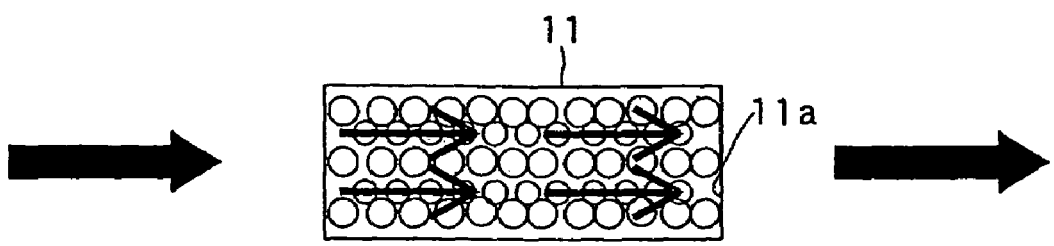
FIG. 2 is a schematic view showing a cartridge incorporated in an ion-exchange filter of a structure weighted on ion exchanging efficiency.
Figure 3A:
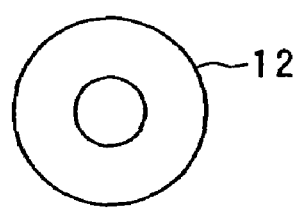
FIG. 3A is a schematic plain view showing a cartridge incorporated in an ion-exchange filter of a structure heavily weighted on pressure loss and FIG. 3B is a schematic sectional view showing a cartridge incorporated in an ion-exchange filter of a structure heavily weighted on pressure loss.
Figure 3B:
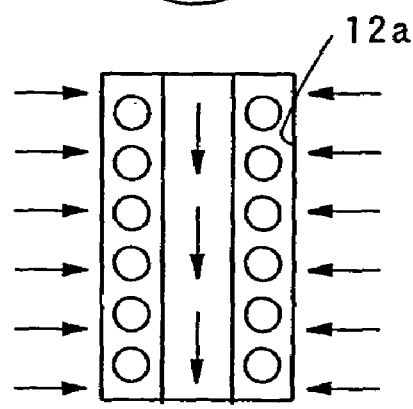

FIGS. 2 and 3 show the schematic views of two kinds of cartridges incorporated, to be detachable, to the ion-exchange filter. That is, FIG. 2 represents a cartridge 11 to be incorporated to an ion-exchange filter having a structure highly valued on an ion exchanging efficiency (which may be called hereunder "ion-exchange efficiency emphasizing type ion-exchange filter"), and on the other hand, FIG. 3 represents a cartridge 12 to be incorporated to an ion-exchange filter having a structure highly valued on a pressure loss (which may be called hereunder "pressure-loss emphasizing type ion-exchange filter").

The ion-exchange efficiency emphasizing type ion-exchange filter in which the cartridge 11 is incorporated has a pressure loss and ion-exchange efficiency higher than those of the pressure-loss emphasizing type ion-exchange filter, and on the contrary, the pressure-loss emphasizing type ion-exchange filter in which the cartridge 12 is incorporated has a pressure loss and ion exchanging efficiency lower than those of the ion-exchanging efficiency emphasizing type ion-exchange filter.

The cartridge 11 for the ion-exchange efficiency emphasizing type ion-exchange filter shown in FIG. 2 is utilized for a case of a condition in which much impurity exists in a circulation circuit and the fuel cell system is not operated as far as the purity is not at first removed with priority or for a case of a vehicle or like which is in such condition as mentioned above. This cartridge 11 is formed with an ion-exchange resin accommodation portion 11a having a columnar or rectangular inner hollow space into which an ion-exchange resin is accommodated, and a liquid or fluid flows from one axial end to the other axial end of such columnar or rectangular ion-exchange resin accommodation portion. This cartridge 11 provides high pressure loss and high ion-exchange efficiency representing a ratio between the impurity ion contained in the flow-in fluid and the removed impurity ion.

The cartridge 12 for the pressure-loss emphasizing type ion-exchange filter shown in FIG. 3 is utilized for a case of a condition in which less impurity exists in a circulation circuit and the fuel cell system is not operated as far as the item of low pressure loss (not the removal of impurity) is at first considered with priority or for a case of a vehicle or like which is in such condition as mentioned above. For example, this cartridge 12 is used for a case of keeping, at low pressure loss, the ion-exchange filter because much amount of fluid flows in the cooling circuit. This cartridge 12 is formed with an ion-exchange resin accommodation portion 12a having an inner hollow cylindrical space into which an ion-exchange resin is accommodated, and a liquid or fluid flows from an outer peripheral portion of the hollow cylindrical structure towards an inner peripheral portion thereof or vice versa. This cartridge 12 provides low pressure loss and low ion exchanging efficiency.

The ion-exchange resin fully contained in the cartridges 11 and 12 is a synthetic resin capable of being coupled with the ion in the solution or ion-exchanged and provided with acidic group or basic group. Cation-exchange resin has sulfone group, calboxyl group or like as solid acid, and hydrogen of its functional group (part of molecule) is released as ion, which is then substituted with cation in the ambient solution. On the other hand, anion-exchange resin is a solid base and its hydroxyl group us exchanged with other anion and then released. The anion is coupled with the resin. The amount of the ion-exchange resin will be set in accordance with polarity, fluid flow rate, amount of impurity and the like.

Figure 4:
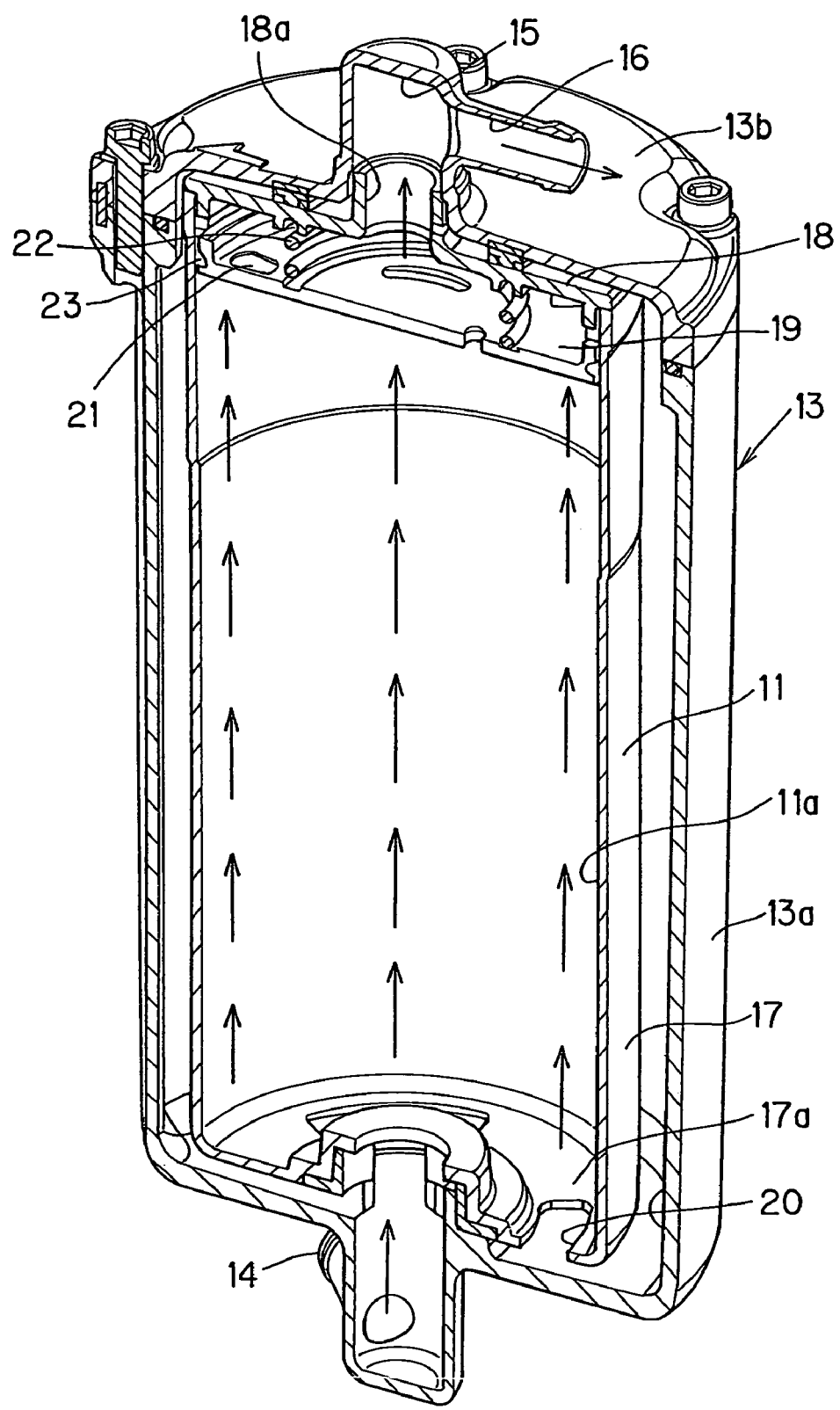
FIG. 4 is a sectional view of the ion-exchange filter of a structure heavily weighted on ion exchanging efficiency.

FIG. 4 is a sectional view of the ion-exchange filter of ion-exchanging efficiency emphasizing type. A case 13 commonly utilized for two kinds of cartridges has a fluid inlet 14 and a fluid outlet 15. The case 13 is provided with a bottomed cylindrical case body 13a and a lid 13b to be mounted detachably to the case body by using a joining member such as bolt. The inlet 14 is formed to the bottom of the case body 13a and the outlet 15 is formed to the lid 13b.

Inside the case 13, the cartridge 11 filled up with the ion-exchange resin is incorporated. The cartridge 11 has a cylindrical ion-exchange resin accommodating portion 11a, which is provided with a bottomed cylindrical body 17, disc-shaped end member 19 disposed inside the cartridge body 17 to be slidable therein and a top plate 18 disposed to the upper end portion of the cartridge body 17.

The cartridge 17 has its lower end portion 17a constituting one end portion of the ion-exchange resin accommodating portion 11a, and this lower end portion 17a is formed with a plurality of holes 20 through which the fluid flows into the cartridge body 17. The fluid flow-in holes 20 are covered with a mesh member having mesh nets each having a size smaller than that of the ion-exchange resin so as to seal the ion-exchange resin in the ion-exchange resin accommodating portion 11a. This mesh member has a net of, for example, 100 μm diameter so as to seal up the ion-exchange resin of about 500 μm.

The other end portion 19 constituting the ion-exchange resin accommodating portion 11a is also formed with a plurality of holes 21 from which the fluid flows out therefrom. The fluid flow-out holes 21 are also covered with a mesh member having mesh nets each having a size smaller than that of the ion-exchange resin so as to seal the ion-exchange resin in the ion-exchange resin accommodating portion 11a.

This end portion 19 acts to press the ion-exchange resin filling the cartridge 11, and for this purpose, the end portion 18 is disposed to be slidable with respect to the cartridge body 17. A coil spring 22 is located between the end portion 19 and the top plate 18 so as to apply a force pressing the ion-exchange resin. A seal member 23 is also located around the outer periphery of the end portion 19, and the top plate 18 is provided, at its central portion, with a tubular projection 18a to be fitted into the fluid outlet 15 formed to the lid 13b.

As mentioned above, the hollow cylindrical ion-exchange resin accommodating portion 11a is formed by these cartridge body 17 and end portion 19.

The liquid flowing through the inlet 14 formed to the lower portion of the case 13 passes the gap between the bottom portion of the case 13 and the lower end portion 17a of the cartridge body 17 and then flows into the ion-exchange resin accommodating portion 11a through the plural flow-in holes 20. The fluid from which the ion is removed by the ion-exchange resin moves upward in the ion-exchange resin accommodating portion 11a and flows out through the flow-out holes 21 formed to the end portion 19. Thereafter, the fluid flows to the outlet 15 formed to the case through the tubular projection 18a of the top plate 18 and then flows out through an orifice 16. Further, a flow mode of the fluid may be reversed, that is, the fluid may flow from the outlet 15 towards the inlet 14.

Figure 5:
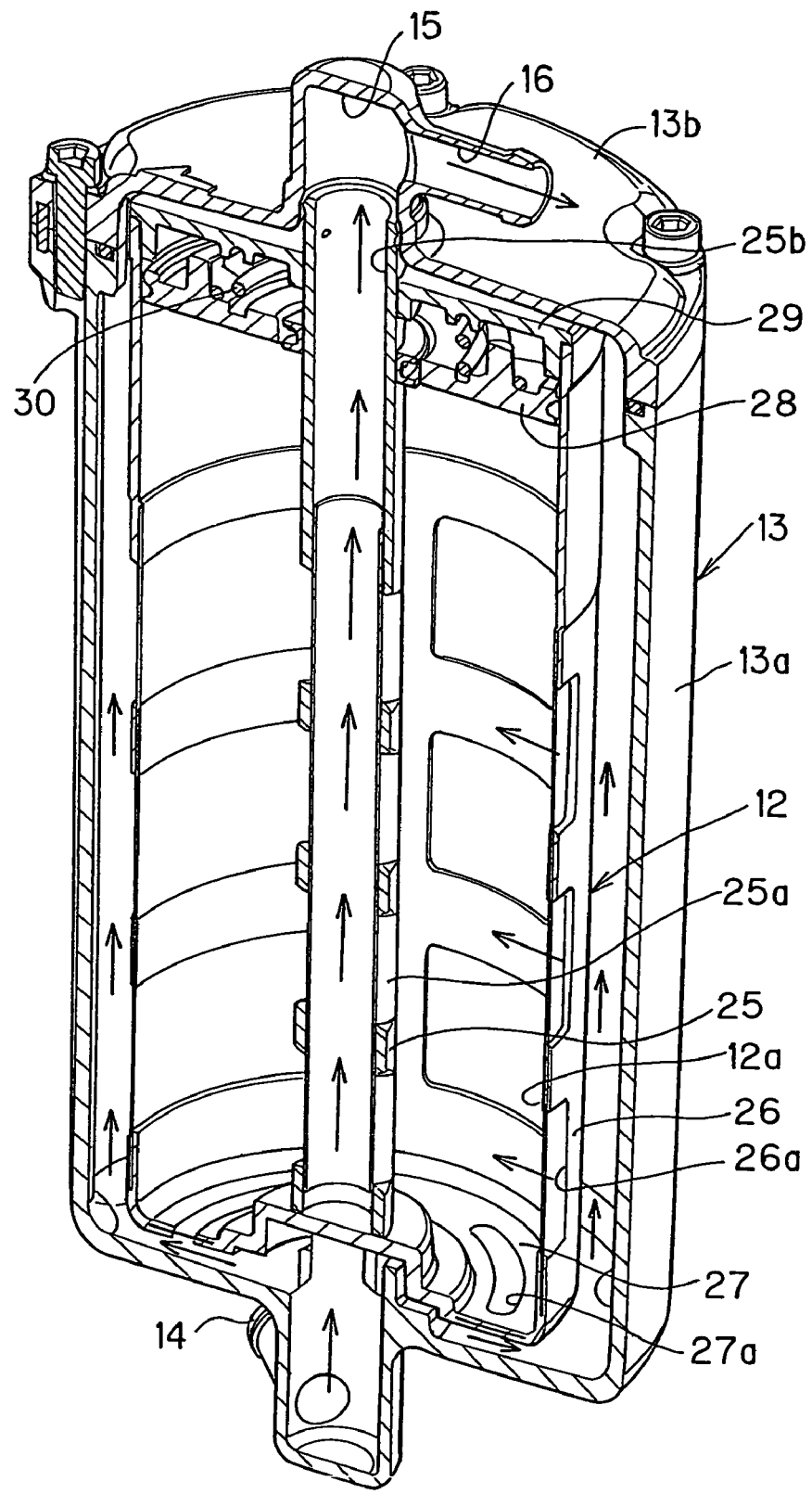
FIG. 5 is a sectional view of the ion-exchange filter of a structure heavily weighted on pressure loss.

FIG. 5 is a sectional view of the ion-exchange filter of pressure-loss consideration type, and the case 13 is itself the same as that of the exchange efficiency consideration type of FIG. 4, so that the same reference numerals are added to the portions or members corresponding to those shown in FIG. 4 and the explanation thereof is omitted herein.

Inside the case 13, the cartridge 12 filled up with the ion-exchange filter is incorporated. This cartridge 12 has a hollow cylindrical ion-exchange resin accommodating portion 12a, which is provided with an inner cylindrical portion 25 forming an inner peripheral portion of the ion-exchange resin accommodating portion 12a and an outer cylindrical portion 26 forming an outer peripheral portion thereof. The outer cylindrical portion 26 is positioned outside the inner cylindrical portion 25 coaxially therewith, and the cartridge 12 is further provided with a pair of end portions 27 and 28 formed to both axial end portions of both the cylindrical portions 25 and 26. It is of course natural that although the inner structure of the cartridge 12 differs from that of the cartridge 11, the outer shape or appearance of both the cartridges 11 or 12 are equal to each other so that these cartridges can be exchanged with each other and easily mounted to the case with substantial no problem.

The inner cylindrical portion 25 is formed, at its outer peripheral portion, with a plurality of flow-out holes 25a through which fluid passes. The flow-out holes 25a are covered with a mesh member having mesh nets each having a size smaller than that of the ion-exchange resin so as to seal the ion-exchange resin in the ion-exchange resin accommodating portion 11a. this mesh member has a net of, for example, 100 μm diameter so as to seal up the ion-exchange resin of about 500 μm. The inner cylindrical portion 25 has an upper end portion 25b projecting upward over the upper side end portion 28 and is fitted into the fluid outlet 15.

The outer cylindrical portion 26 is also formed, at its outer peripheral portion, with a plurality of flow-in holes 26a through which fluid passes. The flow-out holes 25a are also covered with a mesh member having mesh nets each having a size smaller than that of the ion-exchange resin so as to seal the ion-exchange resin.

A pair of end portions 27 and 28 are formed so as to provide an annular shape. One end portion 27 disposed on the bottom side of the case 13 connects the lower end of the inner cylindrical portion 25 and the lower end of the outer cylindrical portion 26. On the other hand, the other one end portion 28 disposed on the top side of the case 13 connects the upper end of the inner cylindrical portion 25 and the upper end of the outer cylindrical portion 26. The lower end portion 27 is also formed with a fluid flow-in hole 27a through which the fluid pass, the flow-in hole 27a being covered with a mesh member.

The upper side end portion 28 has a function of pressing the ion-exchange resin filling in the cartridge 12, and for this purpose, the end portion 28 is disposed to be slidable with respect to the outer and inner cylindrical portions 26 and 25. A top plate 29 is disposed above the end portion 28 in a manner fixed to the outer cylindrical portion 26. A coil spring 22 is located between the end portion 28 and the top plate 29 so as to apply a force pressing the ion-exchange resin. Seal member is also located around the outer and inner periphery of the end portion 28.

As mentioned above, the hollow cylindrical ion-exchange resin accommodating portion 12a filled up with the ion-exchange resin is composed of the inner and outer cylindrical portions 25 and 26 and a pair of the end portions 27 and 28.

The liquid flowing through the inlet 14 formed to the lower portion of the case 13 passes a passage, annular in section, formed between the inner peripheral surface of the case 13 and the outer peripheral portion of the cartridge 12 and then flows into the ion-exchange resin accommodating portion 12a through the plural flow-out holes 25a formed to the inner cylindrical portion 25. Thereafter, the fluid moves in the axial direction, i.e., upward in the illustration, of the inner cylindrical portion 25 and flows out through the outlet 15 and the orifice 16 of the case 13. Further, a flow mode of the fluid may be reversed, that is, the fluid may flow from the outlet 15 towards the inlet 14.

According to the ion-exchange filters of the embodiments of the present invention mentioned above, the pressure-loss emphasizing type ion-exchange filter having reduced low pressure and the exchanging efficiency emphasizing type ion-exchange filter can be provided only by exchanging, with each other, two types of cartridges 11 and 12 assembled in the case. Although the inner structures of these cartridges 11 and 12 are different from each other, the pressure-loss and/or the ion-exchanging efficiency can be changed by changing the diameter of the orifice 16 and the diameters of the holes 20, 21, 25a and 26a through which the fluid passes.

It is to be noted that the present invention is not limited to the described embodiments and many other changes and modifications may be made without departing from the scopes of the appended claims.

For example, another cartridge may be employed, without limited to the types mentioned above, having different pressure-loss and the ion-exchange efficiency as far as the outer shape or appearance of the cartridge has the same shape or appearance as that of the cartridge 11 or 12. Furthermore, the cartridge may be changed or modified in its structure as far as the flow direction of the fluid does not change, and the orifice may be disposed at the fluid inlet portion in place of the fluid outlet portion.

The entire disclosure of Japanese Patent Application No.2003-400036 filed on Nov. 28, 2003 including the specification, claims, drawing and summary is incorporated herein by reference in its entirety.

What is claimed is:

1. An ion-exchange filter for a fuel cell system comprising:

a case having an inlet through which a fluid flows thereinto and an outlet through which the fluid flows out therefrom; and two cartridges, each of the two cartridges being exchangeable for one another disposed in the case and filled up with an ion-exchange resin, said case including a bottomed cylindrical case body to which said inlet is formed and a lid, mounted to be detachable to the case body, to which said outlet is formed, in which the case body is provided with a projected portion projecting inward the case body at a portion of the case body bottom corresponding to the inlet, said two cartridges including a pressure-loss emphasizing type cartridge and an ion-exchange efficiency emphasizing type cartridge, which are exchanged with each other, and in which the ion-exchange efficiency emphasizing type cartridge is one for an ion-exchange filter having a high pressure loss and high ion-exchange efficiency and, on the other hand, the pressure-loss emphasizing type cartridge is one for an ion-exchange filter having a pressure loss lower than that of the former ion-exchange filter and an ion-exchange efficiency lower than that of the former ion-exchange filter, wherein each of the two cartridges has axial one end to which a recessed portion into which said projected portion of the case body is inserted and axial another end to which a projected portion is formed, when the selected either one of both the cartridges is mounted to the cases, the projected portion of the case body is inserted into the recessed portion of the selected cartridge and the projected portion of the selected cartridge is inserted into the outlet of the case so that the selected cartridge is mounted or dismounted to the case together with the mounting or dismounting of the lid to the case body so that either one of the pressure-loss emphasizing type cartridge and ion-exchange efficiency emphasizing type cartridge is selectively mounted to the case.

2. The ion-exchange filter according to claim 1, wherein said ion-exchange efficiency emphasizing type cartridge includes an ion-exchange resin accommodating portion having a hollow cylindrical structure, having both ends closed by end members, respectively, which is filled up with the ion-exchange resin, in which the fluid flows in an axial direction of the cylindrical structure from one end thereof towards another end thereof.

3. The ion-exchange filter according to claim 2, wherein at least one of one and another one end members of the ion-exchange resin accommodating portion is formed with a hole through which the fluid flows, said hole being covered with a mesh member having a mesh net size smaller than a size of the ion-exchange resin disposed inside the ion-exchange resin accommodating portion.

4. The ion-exchange filter according to claim 2, wherein said another one end member of the ion-exchange resin accommodation portion is disposed to be slidable in the axial direction thereof.

5. The ion-exchange filter according to claim 2, wherein said pressure-loss emphasizing type cartridge includes an ion-exchange resin accommodating portion having a hollow cylindrical structure, having an inner cylindrical member and an outer cylindrical member, which are arranged coaxially with each other and has both ends closed by end members, respectively, and the ion-exchange resin accommodation portion is filled up with the ion-exchange resin, in which the fluid flows in an axial direction of the cylindrical structure from one end thereof towards another end thereof in addition that the fluid flows in a radial direction of the cylindrical structure.

6. The ion-exchange filter according to claim 5, wherein said the ion-exchange resin accommodating portion is provided with holes, through which the fluid flows, at least one of the outer and inner peripheral portions thereof, said holes being covered with a mesh member having a mesh net size smaller than a size of the ion-exchange resin disposed inside the ion-exchange resin accommodating portion.

7. The ion-exchange filter according to claim 1, wherein an orifice is further formed to at least one of the inlet and outlet of the case.

* * * * *